United States Patent
Waldspurger et al.

(10) Patent No.: US 12,259,982 B2
(45) Date of Patent: Mar. 25, 2025

(54) SYSTEMS AND METHODS FOR TRANSPARENTLY DETECTING UNENCRYPTED VIRTUAL MACHINE I/O

(71) Applicant: Nutanix, Inc., San Jose, CA (US)

(72) Inventors: Carl Alan Waldspurger, Palo Alto, CA (US); Bijan Mottahedeh, San Mateo, CA (US)

(73) Assignee: Nutanix, Inc., San Jose, CA (US)

( * ) Notice: Subject to any disclaimer, the term of this patent is extended or adjusted under 35 U.S.C. 154(b) by 645 days.

(21) Appl. No.: 17/581,331

(22) Filed: Jan. 21, 2022

(65) Prior Publication Data

US 2023/0237169 A1  Jul. 27, 2023

(51) Int. Cl.
*G06F 21/60* (2013.01)
*G06F 9/455* (2018.01)

(52) U.S. Cl.
CPC ........ *G06F 21/604* (2013.01); *G06F 9/45558* (2013.01); *G06F 21/602* (2013.01); *G06F 2009/45587* (2013.01)

(58) Field of Classification Search
CPC .. G06F 21/604; G06F 9/45558; G06F 21/602; G06F 2009/45587; G06F 2009/45579; G06F 2009/45583; G06F 2009/45591
See application file for complete search history.

(56) References Cited

U.S. PATENT DOCUMENTS

| | | | |
|---|---|---|---|
| 7,260,820 B1 * | 8/2007 | Waldspurger | G06F 9/45558 718/1 |
| 7,623,134 B1 * | 11/2009 | Danilak | G06F 12/1027 345/568 |
| 8,549,518 B1 | 10/2013 | Aron et al. | |
| 8,819,676 B2 * | 8/2014 | Ports | G06F 9/461 718/1 |
| 8,850,130 B1 | 9/2014 | Aron et al. | |
| 9,225,529 B1 * | 12/2015 | Natanzon | H04L 67/1097 |
| 10,198,299 B1 * | 2/2019 | Xu | G06F 13/28 |
| 10,846,145 B2 * | 11/2020 | Xu | G06F 13/4282 |
| 11,520,907 B1 * | 12/2022 | Borowiec | G06F 3/067 |
| 2004/0059912 A1 * | 3/2004 | Zizzi | G06F 21/6209 713/165 |
| 2006/0178997 A1 * | 8/2006 | Schneck | G06F 21/86 705/50 |
| 2007/0297418 A1 * | 12/2007 | Lee | H04L 63/00 370/395.52 |
| 2009/0208014 A1 * | 8/2009 | Betouin | G06F 7/58 708/250 |

(Continued)

OTHER PUBLICATIONS

"What is eBPF An Introduction and Deep Dive into the eBPF Technology," https://ebpf.io/what-is-ebpf/, 1-16 pages.

(Continued)

*Primary Examiner* — Javier O Guzman
(74) *Attorney, Agent, or Firm* — Foley & Lardner LLP (57) ABSTRACT

In some aspects, an apparatus includes a processor and a memory. In some embodiments, the memory includes programmed instructions that, when executed by the processor, cause the apparatus to intercept an I/O transaction between a virtual machine and an I/O device, determine whether data in the I/O transaction indicates a security misconfiguration, and perform a remedial action in response to identifying the security misconfiguration.

24 Claims, 3 Drawing Sheets

(56) References Cited

U.S. PATENT DOCUMENTS

| | | | | |
|---|---|---|---|---|
| 2009/0307445 | A1* | 12/2009 | Jacobs | G06F 11/0793 718/1 |
| 2011/0099319 | A1* | 4/2011 | Mukherjee | G06F 12/1081 711/6 |
| 2011/0191594 | A1* | 8/2011 | Bartlett | G06F 11/2056 713/189 |
| 2011/0246767 | A1* | 10/2011 | Chaturvedi | G06F 21/53 718/1 |
| 2012/0179855 | A1* | 7/2012 | Tsirkin | G06F 9/45558 711/6 |
| 2015/0347320 | A1* | 12/2015 | Spillane | G06F 12/0246 713/193 |
| 2019/0146853 | A1* | 5/2019 | Xu | G06F 9/45558 710/308 |
| 2020/0074091 | A1* | 3/2020 | Jain | H04L 9/0894 |
| 2020/0320214 | A1* | 10/2020 | Harris | H04L 9/0869 |
| 2021/0083843 | A1* | 3/2021 | Salomon | G06F 21/602 |
| 2021/0216625 | A1* | 7/2021 | Miller | G06F 21/602 |
| 2023/0229600 | A1* | 7/2023 | Hirai | G06F 21/56 713/193 |
| 2023/0342172 | A1* | 10/2023 | Tsirkin | G06F 21/606 |

OTHER PUBLICATIONS

Advances Micro Devices, "Secure Encrypted Virtualization API Version 0.24," (Apr. 2020), https://www.amd.com/system/files/TechDocs/55766_SEV-KM_API_Specification.pdf, 1-122 pages.

AMD I_O Virtualization Technology (IOMMU) Specification, 48882.

Cano, Ignacio, et al. "Curator: Self-Managing Storage for Enterprise Clusters" (Mar. 27, 2017), from https://www.usenix.org/conference/nsdi17/.

Han Jaehyun, Lin Zhiqiang, and Porter E. Donald., "On the Effectiveness of Behavior-based Ransomware Detection," http://web.cse.ohio-state.edu/~lin.3021/file/SECURECOMM20c.pdf, 1-23 pages.

Nutanix, "AHV Administration Guide," (Dec. 6, 2021), 1-142 pages.

Nutanix, "Life Cycle Manager Guide," (Dec. 14, 2021), 1-23 pages.

Nutanix, "NCC Checks Reference," (Dec. 15, 2021), 1-195 pages.

Nutanix, "Nutanix Cluster Check (NCC) 4.1.0 Guide," (May 13, 2021), 1-41 pages.

Nutanix, "Nutanix Software Editions & Licensing Solutions to Run on Our Appliances," https://www.nutanix.com/products/software-options, 1-15 pages.

Penrose Phillip, Buchanan J William, Macfarlane J Richard., "DIIN455," (Dec. 2013), https://www.researchgate.net/publication/259164873, 1-15 pages.

Poitras, Steven. "The Nutanix Bible" (Jan. 11, 2014), from http://stevenpoitras.com/the-nutanix-bible/ (Publication date based on indicated capture date by Archive.org; first publication date unknown).

Poitras, Steven. "The Nutanix Bible" (Oct. 15, 2013), from http://stevenpoitras.com/the-nutanix-bible/ (Publication date based on indicated capture date by Archive.org; first publication date unknown).

Poitras, Steven. "The Nutanix Bible" (Sep. 17, 2019), from https://nutanixbible.com/.

Poitras, Steven. "The Nutanix Bible" (Jun. 20, 2014), from http://stevenpoitras.com/the-nutanix-bible/ (Publication date based on indicated capture date by Archive.org; first publication date unknown).

Poitras, Steven. "The Nutanix Bible" (Jan. 7, 2015), from http://stevenpoitras.com/the-nutanix-bible/ (Publication date based on indicated capture date by Archive.org; first publication date unknown).

Poitras, Steven. "The Nutanix Bible" (Jun. 9, 2015), from http://stevenpoitras.com/the-nutanix-bible/ (Publication date based on indicated capture date by Archive.org; first publication date unknown).

Protection Strategies for Direct Access to Virtualized I_O Devices. Sec19-li-mengyuan_0.

Vmw-white-paper-secrty-vsphr-hyprvsr-uslet-101.

Waldspurger Carl, Rosenblum Mendel., "I/O Virtualization," (Jan. 2012), https://cacm.acm.org/magazines/2012/1/144808-i-o-virtualization/fulltext, 1-8 pages.

* cited by examiner

SYSTEMS AND METHODS FOR TRANSPARENTLY DETECTING UNENCRYPTED VIRTUAL MACHINE I/O

BACKGROUND

Hardware support for secure computing environments can provide cryptographic protection for data-in-use. For example, AMD's Secure Encrypted Virtualization (AMD SEV) associates a unique key with each virtual machine (VM), which the hardware memory controller can automatically encrypt data stored to main memory and decrypt data loaded from main memory. As a result, memory associated with one VM can be isolated cryptographically from both other VMs and the hypervisor. This can ensure data confidentiality, even if traditional access controls for memory are subverted, or the hypervisor itself is compromised.

SUMMARY

The disclosure relates generally to virtualization and, more particularly, to systems and methods for transparently detecting unencrypted virtual machine I/O.

In some aspects, an apparatus includes a processor and a memory. In some embodiments, the memory includes programmed instructions that, when executed by the processor, cause the apparatus to intercept an I/O transaction between a virtual machine and an I/O device, determine whether data in the I/O transaction indicates a security misconfiguration, and perform a remedial action in response to identifying the security misconfiguration.

In some embodiments, the security misconfiguration is a misconfiguration of data encryption in the virtual machine. In some embodiments, the security misconfiguration is that the data is unencrypted. In some embodiments, the memory includes the programmed instructions that, when executed by the processor, further cause the processor to intercept a memory page when being used for direct memory access. In some embodiments, the memory includes the programmed instructions that, when executed by the processor, further cause the processor to hook I/O emulation code.

In some embodiments, the memory includes the programmed instructions that, when executed by the processor, further cause the processor to perform a statistical test of randomness and determine that the I/O data is unencrypted in response to performing the statistical test of randomness. In some embodiments, the memory includes the programmed instructions that, when executed by the processor, further cause the processor to determine whether an entropy of the I/O data exceeds a threshold and determine that the I/O data is unencrypted in response to determining that the entropy of the I/O data does not exceed the threshold. In some embodiments, the memory includes the programmed instructions that, when executed by the processor, further cause the processor to determine whether a space reduction of the I/O data due to compression of the I/O data exceeds a threshold and determine that the I/O data is unencrypted in response to determining that the space reduction of the I/O data exceeds the threshold.

In some embodiments, the I/O transaction is sampled from a set of I/O transactions. In some embodiments, the remedial action comprises one or more of sending an alert to a user interface, suspending execution of the virtual machine, or returning an I/O error without performing the I/O transaction. In some embodiments, the apparatus is one of a hypervisor coupled to the virtual machine and the I/O device, a user space process coupled to the virtual machine and the I/O device, or the I/O device.

In some aspects, a non-transitory computer readable storage medium includes instructions stored thereon that, when executed by a processor, cause the processor to intercept an I/O transaction between a virtual machine and an I/O device, determine whether data in the I/O transaction indicates a security misconfiguration, and perform a remedial action in response to identifying the security misconfiguration.

In some aspects, a computer-implemented method by a processor includes intercepting an I/O transaction between a virtual machine and an I/O device, determining whether data in the I/O transaction indicates a security misconfiguration, and performing a remedial action in response to identifying the security misconfiguration.

Further details of aspects, objects, and advantages of the disclosure are described below in the detailed description, drawings, and claims. Both the foregoing general description and the following detailed description are exemplary and explanatory and are not intended to be limiting as to the scope of the disclosure. Particular embodiments may include all, some, or none of the components, elements, features, functions, operations, or steps of the embodiments disclosed above. The subject matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The foregoing and other features of the present disclosure will become apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

Hardware support for secure computing environments may provide cryptographic protection for data-in-use. For example, one implementation can associate a unique key with each virtual machine (VM), which the hardware memory controller can use to automatically encrypt data stored to main memory and decrypt data loaded from main memory. As a result, memory associated with one VM can be isolated cryptographically from both other VMs and the hypervisor. This arrangement can ensure data confidentiality, even if traditional access controls for memory are subverted, or the hypervisor itself is compromised.

Per-VM encryption keys may be managed by a secure processor hardware and used only for local memory encryption while a VM is executing. When a VM interacts with external input/output (I/O) devices such as disks, or communicates with remote systems over a network, data transfers can be protected using conventional cryptographic approaches, such as encrypted storage for data-at-rest (using separate long-lived keys), and the secure sockets layer (SSL) protocol for data-in-transit (using separately negotiated per-session keys).

I/O devices may support direct memory access (DMA), which enables an I/O device to read and write host memory directly, without involving the central processing unit (CPU), which may achieve high performance. In a secure computing environment where I/O devices do not have access to the private per-VM keys managed by the CPU, DMA cannot be performed directly on encrypted VM memory. Instead, I/O devices can perform DMA operations that access specially designated memory buffers that reside in unencrypted memory, which the CPU can copy to/from encrypted memory for further processing.

In one implementation, all DMA (from either real hardware or emulated devices) occurs using unencrypted memory pages. The guest operating system (OS) running within the VM can control whether a page is "private" (encrypted) or "shared" (unencrypted) using the enCrypted bit (C-bit) in the guest page tables. As a result, the guest can allocate unencrypted shared memory for DMA. However, since I/O operations may commonly specify any guest memory as the source or target of DMA operations, some implementations utilize unencrypted "bounce buffers," such as those provided by the Linux SWIOTLB subsystem.

In order to avoid leaking sensitive data, the guest OS software running within a VM can protect the data involved in DMA transfers, such as by using an encrypted file system or whole-disk encryption (e.g., encrypted block storage) for storage, and SSL for secure networking. However, any misconfiguration within the VM that omits these protections could place sensitive data at risk. It is desirable to inform an owner (e.g., user) of a VM about such misconfigurations to improve security.

One approach is for the hypervisor to attempt to verify that appropriate guest-level protections are enabled when the hypervisor launches the VM. However, since guest memory is (deliberately) opaque to the hypervisor, this approach may require explicit integrations or cooperation between the VM and the hypervisor, e.g., to perform guest-OS-specific checks regarding networking and disk configurations. Such checks may be inherently fragile, and may need to be updated to reflect new versions of various software components, etc. In addition, since a reason for using a secure computing environment is to protect the VM from a potentially compromised or malicious hypervisor, requiring cooperation that exposes guest OS details to the hypervisor may be counterproductive to protecting the VM from a malicious hypervisor.

What is desired is a transparent way for the hypervisor to detect if a VM is performing I/O operations involving unencrypted data, which can be referred to as "plaintext" or "cleartext" data, without requiring any cooperation from the guest. If unencrypted I/O is detected, the hypervisor can alert the VM owner that the guest OS may be improperly configured, which the owner can check independently.

Disclosed herein are embodiments of a system and method for transparently detecting unencrypted VM I/O, such as contents of memory involved in DMA operations. Some embodiments of the system and method intercept an I/O transaction, determine whether I/O data in the I/O transaction is unencrypted, and perform a remedial action in response to determining that the I/O data is unencrypted. In some embodiments, the system and method can perform tests to check whether the I/O data is unencrypted.

Advantageously, embodiments of the system and method protect the VM data that may be otherwise encrypted due to a VM misconfiguration. Embodiments of the system and method can limit exposure of the VM data to malicious or compromised devices or software, without introducing new vulnerabilities by exposing the VM to an untrusted hypervisor.

Some embodiments of the system and method are part of a suite of checks/tests that identify poor security configurations, old versions, etc. Some embodiments of the system and method are an extension of Life Cycle Management (LCM) or Nutanix cluster check (NCC) and can be integrated with third party scanners. Some embodiments of the system and method are part of various tiers of a software as a service (SaaS), such as "Pro" or "Ultimate" tiers of Acropolis Hypervisor (AHV), a hypervisor offering of Nutanix. In some embodiments, when AMD SEV support is enabled for a VM, an NCC check can warn that in fact the VM is not configured correctly, and the hypervisor can see confidential data. Some embodiments may include a third-party scanning integration.

Figure 1:
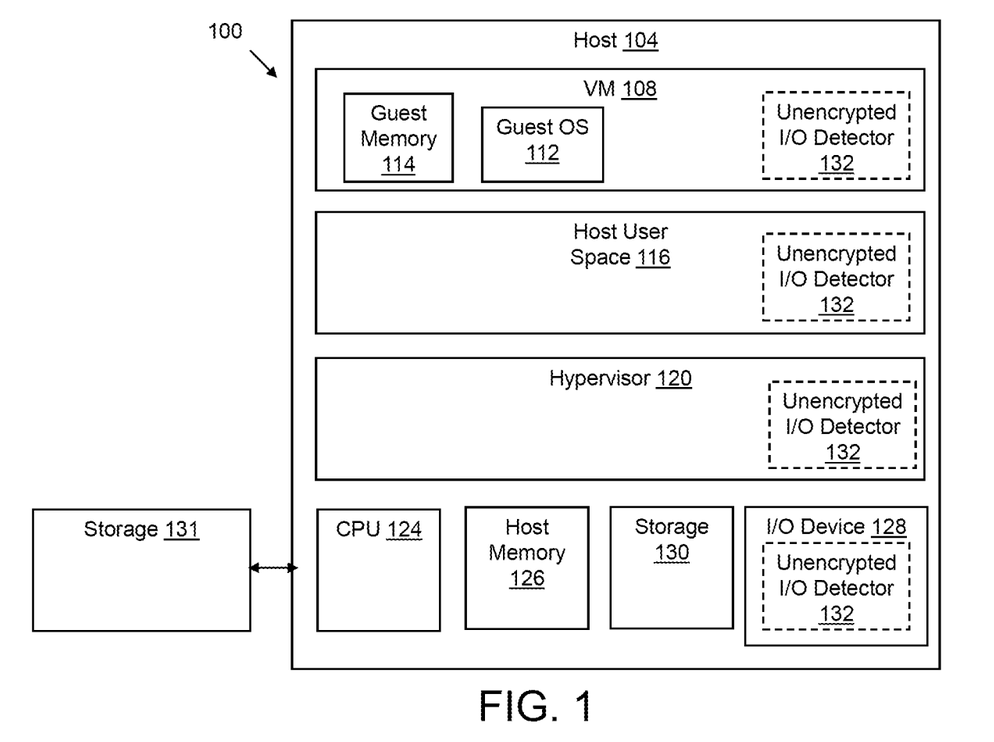
FIG. 1 illustrates a block diagram of a system for detecting unencrypted I/O data, in accordance with some embodiments.

FIG. 1 illustrates a block diagram of a system 100 for detecting unencrypted I/O data, in accordance with some embodiments. The system 100 includes one or more hosts (e.g., nodes, host machines, computers, servers, a cluster of hosts, etc.) such as the host 104. The host 104 includes one or more VMs such as VM 108. The VM 108 includes a guest OS 112 and guest memory 114. The guest memory 114 may be the source or target of I/O operations such as DMA operations. The VM 108 can include one or more applications, scripts, etc., that interact with the guest OS 112 and the guest memory 114. The VM 108 can be exposed to one or more underlying resources of the host 104. The VM 108 can issue I/O accesses, e.g., using a SCSI protocol.

The host includes a host user space 116. The host user space 116 can include one or more processes such as a Linux Quick Emulator (QEMU) process. The processes in the host user space 116 can have access to the guest memory 114. Some guest (I/O) operations may be (effectively) intercepted by processes in the host user space 116.

The host includes a hypervisor 120 (a bare-metal hypervisor, a hosted/kernel-based hypervisor, a host operating system such as Linux, a kernel, or a combination thereof), which can virtualize one or more underlying resources and expose the virtualized resources to the VM 108. In some embodiments, the hypervisor 120 interposes on privileged hardware operations from the guest OS 112 executing in the VM 108. The hypervisor 120 can allocate hardware resources dynamically and transparently to manage interactions between the underlying hardware and the VM 108. The hypervisor 120 can intercept requests from the VM 108 and convert them to another type of request (e.g., IP-based protocol such as iSCSI, CIFS, or NFS) as part of its hardware emulation layer. The hypervisor 120 may include or support a loadable kernel module (e.g., a kernel module that is dynamically loaded into the hypervisor 120).

The host includes underlying resources. The underlying resources include one or more CPUs such as a CPU 124. The CPU 124 can execute software code. In some embodiments, the VM 108, the host user space 116, and the hypervisor 120 are software code executed by the CPU 124 residing at the host 104.

The underlying resources include one or more I/O devices such as I/O device 128. The I/O device 128 can be a hardware device that executes software code in device firmware or software. The I/O device 128 can be a virtual device that includes, or is associated with, device emulation software. The I/O device 128 can perform I/O on behalf of the VM 108. The I/O device 128 can manage storage resources associated with the VM 108, or any storage resources of the cluster that the VM 108 belongs to. The I/O device 128 can access information stored on the storage 130 or the storage 131. For example, the I/O device 128 can write memory contents of the guest memory 114 of the VM 108 to or read data from the storage 130 or the storage 131 and write it to the guest memory 114 of the VM 108. In some embodiments, the I/O device 128 is a virtual (e.g., emulated) I/O device. In some embodiments, the I/O device 128 is a physical I/O device. The I/O device 128 can provide an abstraction of the storage 130 or the storage 131 that scales with the number of hosts 104. As such, the system 100 can operate as a hyperconverged cluster, or a portion thereof.

The underlying resources include one or more host memories such as host memory 126. The guest memory 114 may be mapped to one or more portions of the host memory 126. The host memory 126 may include, but is not limited to (a) temporary memory device such as random-access memory (RAM) or (b) NVM (e.g., persistent memory) such as non-volatile dual in-line memory modules (NVDIMM), read only memory (ROM) devices, any type of magnetic storage devices, optical disks, smart cards, solid state devices, etc.

The storage 130 may be on the host 104 and the storage 131 may be on another host or otherwise accessible via a network by the host 104. The storage 130 or the storage 131 may include, but is not limited to, NVM such as NVDIMM or battery-backed RAM, storage devices, optical disks, smart cards, hard disk drives (HDD), solid state devices (SSD), etc. The storage 130 or the storage 131 can be shared with one or more host machines such as the host 104. The storage 130 or the storage 131 can store data associated with the host 104. The data can include file systems, databases, computer programs, applications, etc. In some such embodiments, the storage 130 or the storage 131 can be partition of a larger storage device or pool. In some embodiments, the storage 130 or the storage 131 is accessible via a storage area network (SAN) or a network-attached-storage (NAS) such as Networked File System (NFS), or Common Internet File System (CIFS).

In some embodiments, the host 104 includes an unencrypted I/O detector 132. The unencrypted I/O detector 132 can leverage the ability of the hypervisor 120 to observe the contents of memory involved in DMA operations, such as data in unencrypted guest bounce buffers. In some embodiments, the unencrypted I/O detector 132 is in, or executed by, one or more of the VM 108, the host user space 116, the hypervisor 120, or the I/O device 128. Since the hypervisor 120 can interpose on VM 108 I/O operations, the unencrypted I/O detector 132 in the hypervisor 120 can easily identify the memory regions that a VM 108 specifies for DMA with I/O devices and inspect their contents. Alternatively, the I/O device 128 can inspect the data flowing through it.

Figure 2:
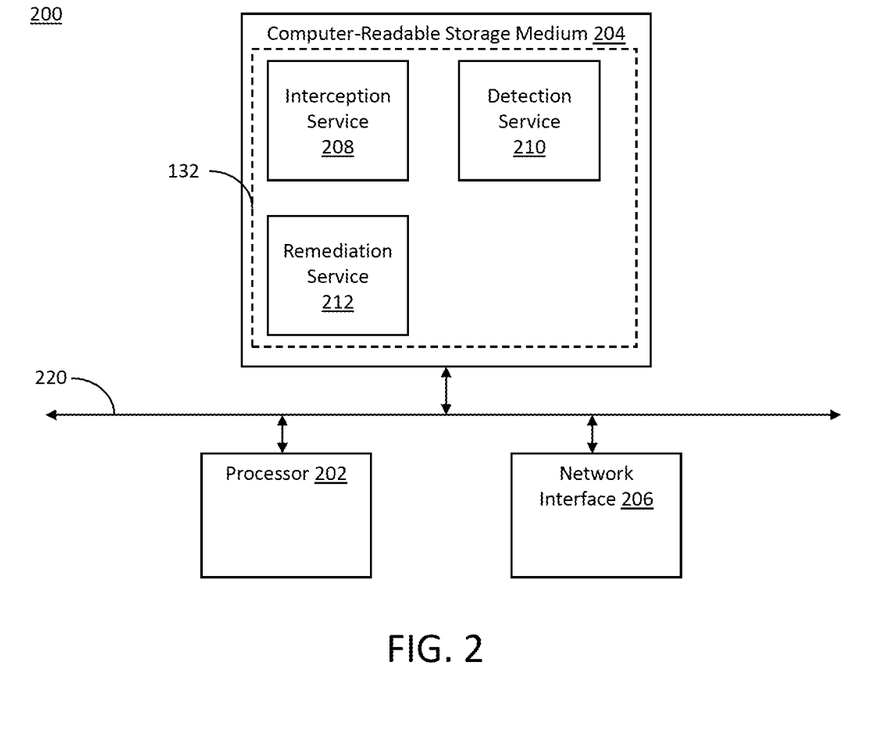
FIG. 2 illustrates a block diagram of the system including the unencrypted I/O detector, in accordance with some embodiments.

FIG. 2 illustrates a block diagram of a system 200 including the unencrypted I/O detector 132, in accordance with some embodiments. The system 200 can be an implementation of the system 100, or vice-versa. In some embodiments, the system 200 includes a processor 202. Processor 202 is configured to execute computer program code, scripts, applications, or services, such as an interception service 208, a detection service 210, and a remediation service 212, encoded in computer-readable storage medium 204 (referred to herein as storage medium 204). In one or more embodiments, processor 202 is a central processing unit (CPU), a multi-processor, a distributed processing system, an application specific integrated circuit (ASIC), a process, and/or a suitable processing unit. In some embodiments, the processor 202 is the CPU 124 or the I/O device 128.

In some embodiments, the system 200 includes the storage medium 204. In one or more embodiments, the storage medium 204 is an electronic, magnetic, optical, electromagnetic, infrared, and/or a semiconductor system (or apparatus or device). For example, the storage medium 204 includes a semiconductor or solid-state memory, a random access memory (RAM), a read-only memory (ROM), a magnetic tape, a removable computer diskette, a rigid magnetic disk, and/or an optical disk. In some embodiments, the computer readable medium 204 is the host memory 126, the storage 130, or the storage 131.

In some embodiments, the storage medium 204 includes an unencrypted I/O detector 132. In some embodiments, the unencrypted I/O detector 132 includes an interception service 208. In some embodiments, the interception service 208 intercepts (e.g., hooks, interposes on, inspects, accesses) VM I/O operations. For example, the interception service 208 can inspect the contents of memory pages when they are being used for DMA. In some embodiments, the interception service 208 inspects the contents of memory pages when the mapping between the virtual and physical memory is fixed (e.g., pinned) for DMA, when initiating (e.g., launching) an I/O request, or when vIOMMU/IOMMU translations are updated. In some embodiments, the interception service 208 hooks I/O emulation code in a virtualization component (e.g., process) in the host user space 116, such as QEMU in Linux. In some embodiments, the interception service 208 performs per-device interposition. For example, the I/O device 128 in the virtualization stack of the host 104, which can run as a separate process and performs disk I/O on behalf of a VM, may have direct access to I/O buffers which it can inspect.

In some embodiments, the interception service 208 interposes on I/O within the VM 108. In some embodiments, the interception service 208 integrates specific checks for each supported guest OS (every version of Linux, Windows, etc.). In some embodiments, the interception service 208 has checks at the VM 108 level and one of the hypervisor 120 level or the I/O device 128 level.

Some implementations may leverage existing frameworks to interpose on guest-level or host-level I/O operations, such as extended Berkeley Packet Filters (eBPF). In some embodiments, memory-management features such as a virtual coIOMMU that supports cooperation between the guest and hypervisor could be utilized to interpose on DMA. Some implementation techniques may be able to provide more granular information regarding both the I/O device and software entity involved in performing unencrypted I/O, which can enable more detailed alerts to help a VM 108 owner pinpoint misconfigurations.

In some embodiments, the unencrypted I/O detector 132 includes a detection service 210. The detection service 210 can determine whether the I/O data is unencrypted. In some embodiments, the detection service 210 performs tests to check whether or not data involved in VM I/O operations is encrypted. In other words, the tests can classify the encryption state of the VM I/O data. The detection service 210 can perform one or more (statistical) tests of randomness to determine whether the VM I/O data is unencrypted. For example, a statistical test may yield a significance value (e.g., a p-value) that can be compared against a threshold to determine if the VM I/O data is unencrypted.

One type of (statistical) test of randomness can be a test that computes entropy. Encrypted data should be indistinguishable from random data. Since encrypted data can appear random, encrypted data should have high entropy. In one embodiment, the detection service 210 computes the entropy of I/O data and checks whether the entropy exceeds a threshold. If the detection service 210 determines that the entropy exceeds the threshold, the detection service 210 can determine that the I/O data is not unencrypted.

One type of test of randomness can be a test that computes compressibility. Since encrypted data appears random, encrypted data may have very low compressibility. In one embodiment, the detection service 210 compresses the data with a standard compression algorithm, and checks whether the space reduction exceeds a threshold. If the detection service 210 determines that the space reduction exceeds the threshold, the detection service 210 can determine that the I/O data is unencrypted.

The detection service 210 can perform one or more (statistical) tests of byte frequency distribution (BFD). Byte frequency distribution can be a count of the frequency of occurrence of each possible byte value (e.g., 0-255). In some embodiments, different information (e.g., entropy, compressibility, BFD, Kolmogorov complexity) can be combined to determine whether I/O data is not encrypted.

In some embodiments, the detection service 210 samples the I/O data. Inspecting all I/O requests to check for unencrypted data may incur unacceptable overhead. Instead, sampling and testing only a small fraction of I/O data may be sufficient to detect a misconfigured guest which is not using encryption for some I/O devices.

In some embodiments, the unencrypted I/O detector 132 includes a remediation service 212. The remediation service 212 can perform a remedial action in response to the detection service 210 determining that the I/O data is unencrypted. As mentioned above, if (a large amount of) unencrypted I/O data is detected for a VM 108, the remediation service 212 can notify the VM 108 owner, alerting them that their guest OS 112 is (likely) misconfigured. Such alerts could be posted in a user interface (UI), or delivered via a messaging platform such as email, text, or chat. The alert may include details about the checks which identified the unencrypted data. The remediation service 212 can cause another component in the host 104, such as the hypervisor 120, to notify the VM 108 owner that their guest OS 112 is misconfigured.

In some embodiments, the remediation service 212 suspends VM 108 execution (automatically) or instructs another component in the host 104 to suspend VM 108 execution. In some embodiments, the remediation service 212 can resume VM 108 execution at the discretion of the VM 108 owner or based on a policy. In some embodiments, the remediation service 212 fails (e.g., does not perform) the I/O request and/or returns an I/O error for the I/O request.

In some embodiments, the system 200 includes a network interface 206. The network interface 206 allows components of the system 200 to communicate with each other. The network interface 206 includes wireless network interfaces such as Bluetooth, Wi-Fi, Global System for Mobile Communications (GSM), wideband code division multiple access (WCDMA), Long-Term Evolution (LTE), or 5G; or wired network interfaces such as Ethernet or Universal Serial Bus (USB). In some embodiments, the network interface 206 is the I/O device 128.

In some embodiments, the system 200 includes a bus 220. The bus 220 may couple the processor 202, the storage medium 204, and the network interface 206. The bus 220 can include a USB bus, a SCSI bus, a FireWire bus, an Ethernet bus, a Gigabit Ethernet bus, a Fibre Channel bus, or a Thunderbolt bus.

Figure 3:
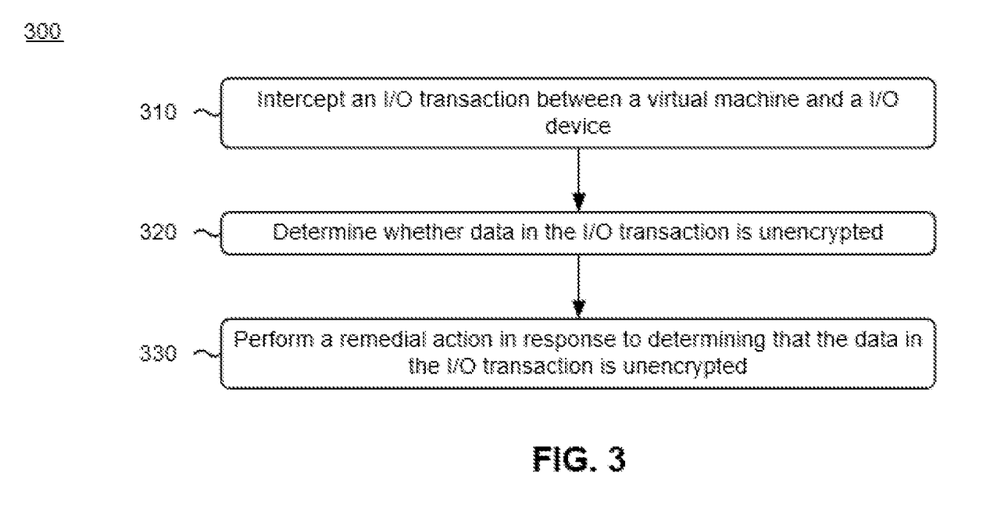
FIG. 3 illustrates a flowchart of an example method for transparently detecting virtual machine I/O, in accordance with some embodiments of the present disclosure.

Referring now to FIG. 3, a flowchart of an example method 300 for transparently detecting virtual machine I/O, in accordance with some embodiments of the present disclosure. The method 300 may be implemented using, or performed by, one or more of the systems (e.g., one of the systems 100 or 200), one or more components (e.g., the host 104, the VM 108, the host user space 116, the hypervisor 120, the I/O device 128, the unencrypted I/O detector 132, the interception service 208, the detection service 210, the remediation service 212, etc.) of one or more of the systems, a processor associated with one or more of the systems, or a processor of the one or more components of the one or more of the systems. Additional, fewer, or different operations may be performed in the method 300 depending on the embodiment. Additionally, or alternatively, two or more of the blocks of the method 300 may be performed in parallel.

In brief overview, a processor (e.g., a processor associated with the unencrypted I/O detector 132) can intercept an I/O transaction between a virtual machine and an I/O device (operation 310). The processor can determine whether data in the I/O transaction indicates a security misconfiguration (operation 320). The processor can perform a remedial action in response to identifying the security misconfiguration (operation 330).

In more detail, at operation 310, in some embodiments, a processor (e.g., a processor associated with the unencrypted I/O detector 132) intercepts an I/O transaction between a virtual machine (e.g., the VM 108) and an I/O device (e.g., the I/O device 128). In some embodiments, the processor intercept a memory page when being used for direct memory access. In some embodiments, the processor intercept a memory page when the mapping between the virtual and physical memory is fixed for direct memory access. In some embodiments, the processor hooks I/O emulation code. In some embodiments, the I/O transaction is sampled from a set of I/O transactions.

At operation 320, in some embodiments, the processor determine whether data in the I/O transaction indicates a security misconfiguration. In some embodiments, the security misconfiguration is a misconfiguration in the virtual machine. In some embodiments, the security misconfiguration is a misconfiguration of data encryption in the virtual machine. In some embodiments, the security misconfiguration is that the data is unencrypted. In some embodiments, the security misconfiguration is that the data in the virtual machine is unencrypted. The processor can perform statistical tests of randomness. The processor can compute the entropy of the I/O data. In some embodiments, the processor determines whether the entropy of the I/O data exceeds a threshold. In some embodiments, the processor determines that the I/O data is unencrypted in response to determining that the entropy of the I/O data does not exceed the threshold.

The processor can compress the I/O data. The processor can compute a space reduction responsive to compressing the I/O data. In some embodiments, the processor determines whether the space reduction of the I/O data due to compression of the I/O data exceeds a threshold. In some embodiments, the processor determines that the I/O data is unencrypted in response to determining that the space reduction of the I/O data exceeds the threshold.

At operation 330, in some embodiments, the processor performs a remedial action in response to identifying the security misconfiguration. In some embodiments, the processor performs a remedial action in response to determining that the data in the I/O transaction is unencrypted. In some embodiments, the processor performs a remedial action in response to determining that the data in the virtual machine is unencrypted. In some embodiments, the remedial action includes sending an alert to a user interface. In some embodiments, the remedial action includes suspending execution of the virtual machine. In some embodiments, the remedial action includes returning an error for the I/O request (without performing the I/O).

In some embodiments, the method 300 is performed by a processor associated with a hypervisor (e.g., the hypervisor 120) coupled to the virtual machine. In some embodiments, the method 300 is performed by a user space process (e.g., a user space process in the host user space 116) accessible by the guest operating system (e.g., guest OS 112) of the virtual machine. In some embodiments, the method 300 is performed by a processor associated with the I/O device. In some embodiments, the method 300 is performed by a processor associated with the virtual machine.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to disclosures containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the disclosure be defined by the claims appended hereto and their equivalents.

What is claimed:

1. An apparatus comprising a processor and memory, wherein the memory comprises programmed instructions that, when executed by the processor, cause the processor to:
   intercept, via a hypervisor, an I/O transaction between a virtual machine and a I/O device;
   analyze, by the hypervisor, contents of memory pages storing data included in the intercepted I/O transaction;
   determine, by the hypervisor, whether data in the intercepted I/O transaction is unencrypted based on the analysis of the memory pages; and
   in response to determining that the data in the intercepted I/O transaction is unencrypted, perform, by the hypervisor, a remedial action, wherein the remedial action comprises at least one of:
      preventing the intercepted I/O transaction from completing,
      suspending execution of the virtual machine, and
      generating an alert indicating detected unencrypted I/O operations.

2. The apparatus of claim 1, wherein the memory comprises the programmed instructions that, when executed by the processor, further cause the processor to intercept a memory page when being used for direct memory access.

3. The apparatus of claim 1, wherein the memory comprises the programmed instructions that, when executed by the processor, further cause the processor to hook I/O emulation code.

4. The apparatus of claim 1, wherein the memory comprises the instructions that, when executed by the processor, further cause the processor to:
   perform a statistical test of randomness using the contents of the memory pages storing data included in the intercepted I/O transaction; and
   determine that the data in the intercepted I/O transaction is unencrypted in response to performing the statistical test of randomness.

5. The apparatus of claim 1, wherein the memory comprises the instructions that, when executed by the processor, further cause the processor to:
   determine whether an entropy of the contents of the memory pages storing data included in the intercepted I/O transaction exceeds a threshold; and
   determine that the data in the intercepted I/O transaction is unencrypted in response to determining that the entropy does not exceed the threshold.

6. The apparatus of claim 1, wherein the memory comprises the programmed instructions that, when executed by the processor, further cause the processor to:
   determine whether a space reduction of the contents of the memory pages storing data included in the intercepted I/O transaction due to compression exceeds a threshold; and
   determine that the data in the intercepted I/O transaction is unencrypted in response to determining that the space reduction exceeds the threshold.

7. The apparatus of claim 1, wherein the I/O transaction is sampled from a set of I/O transactions.

8. The apparatus of claim 1, wherein the apparatus supports hardware memory encryption.

9. The apparatus of claim 1, wherein the virtual machine and the I/O device are on a same host.

10. A non-transitory computer readable storage medium comprising instructions stored thereon that, when executed by a processor, cause the processor to:
    intercept, via a hypervisor, an I/O transaction between a virtual machine and a I/O device;
    analyze, by the hypervisor, contents of memory pages storing data included in the intercepted I/O transaction;
    determine, by the hypervisor, whether data in the intercepted I/O transaction is unencrypted based on the analysis of the memory pages; and
    in response to determining that the data in the intercepted I/O transaction is unencrypted, perform, by the hypervisor, a remedial action, wherein the remedial action comprises at least one of:
       preventing the intercepted I/O transaction from completing,
       suspending execution of the virtual machine, and
       generating an alert indicating detected unencrypted I/O operations.

11. The medium of claim 10, comprising the instructions stored thereon that, when executed by the processor, further cause the processor to intercept a memory page when being used for direct memory access.

12. The medium of claim 10, comprising the instructions stored thereon that, when executed by the processor, further cause the processor to hook I/O emulation code.

13. The medium of claim 10, comprising the instructions stored thereon that, when executed by the processor, further cause the processor to:
    perform a statistical test of randomness using the contents of the memory pages storing data included in the intercepted I/O transaction; and
    determine that the data in the intercepted I/O transaction is unencrypted in response to performing the statistical test of randomness.

14. The medium of claim 10, comprising the instructions stored thereon that, when executed by the processor, further cause the processor to:
    determine whether an entropy of the contents of the memory pages storing data included in the intercepted I/O transaction exceeds a threshold; and
    determine that the data in the intercepted I/O transaction is unencrypted in response to determining that the entropy does not exceed the threshold.

15. The medium of claim 10, comprising the instructions stored thereon that, when executed by the processor, further cause the processor to:
    determine whether a space reduction of the contents of the memory pages storing data included in the intercepted I/O transaction due to compression exceeds a threshold; and
    determine that the data in the intercepted I/O transaction is unencrypted in response to determining that the space reduction exceeds the threshold.

16. The medium of claim 10, wherein the I/O transaction is sampled from a set of I/O transactions.

17. The medium of claim 10, wherein the processor supports hardware memory encryption.

18. The medium of claim 10, wherein the virtual machine and the I/O device are on a same host.

19. A method comprising:
    intercepting, by a hypervisor, an I/O transaction between a virtual machine and an I/O device;
    analyzing, by the hypervisor, contents of memory pages storing data included in the intercepted I/O transaction;
    determining, by the hypervisor, whether data in the intercepted I/O transaction is unencrypted based on the analysis of the memory pages; and
    in response to determining that the data in the intercepted I/O transaction is unencrypted, performing, by the hypervisor, a remedial action, wherein the remedial action comprises at least one of:

preventing the intercepted I/O transaction from completing, suspending execution of the virtual machine, and generating an alert indicating detected unencrypted I/O operations.

20. The method of claim 19, further comprising intercepting a memory page when being used for direct memory access.

21. The method of claim 19, further comprising:

performing a statistical test of randomness using the contents of the memory pages storing data included in the intercepted I/O transaction; and determining that the data in the intercepted I/O transaction is unencrypted in response to performing the statistical test of randomness.

22. The method of claim 19, further comprising:

determining whether an entropy of the contents of the memory pages storing data included in the intercepted I/O transaction exceeds a threshold; and determining that the data in the intercepted I/O transaction is unencrypted in response to determining that the entropy does not exceed the threshold.

23. The method of claim 19, further comprising:

determining whether a space reduction of the contents of the memory pages storing data included in the intercepted I/O transaction due to compression of the I/O data exceeds a threshold; and determining that the data in the intercepted I/O transaction is unencrypted in response to determining that the space reduction exceeds the threshold.

24. The method of claim 19, wherein the virtual machine and the I/O device are on a same host.

* * * * *